Nov. 21, 1944. G. A. SCHIEL ET AL 2,363,268
BEET THINNER
Filed July 1, 1943

GOTTLIEB A. SCHIEL
GOTTLIEB P. BEREN
INVENTOR.

BY Martin E. Anderson
Attorney

Patented Nov. 21, 1944

2,363,268

UNITED STATES PATENT OFFICE 2,363,268

BEET THINNER

Gottlieb A. Schiel and Gottlieb P. Beren, Denver, Colo., assignors of one-third to Martin E. Anderson, Denver, Colo.

Application July 1, 1943, Serial No. 493,152

6 Claims. (Cl. 97—22)

This invention relates to improvements in thinners for row crops and has reference more particularly to an apparatus for thinning such row crops as sugar beets, carrots, turnips and mangels.

Throughout this country and many foreign countries, large acreages of sugar beets are planted every year for the production of sugar. Under the present method of planting, the seeds which normally contain a large number of seed germs, are first broken so that each particle contains only a single germ. Such seeds are planted quite close in a row and when they have germinated, the row will constitute a line of roots positioned in close proximity to each other. Since sugar beets and other roots grow quite large, they naturally require considerable space and it is therefore necessary to thin the roots, leaving preferably single roots at spaced intervals. The method commonly employed for thinning beet roots of this kind, consists in the employment of a hoe of the proper width by means of which the laborer, by a movement of the hoe transversely of the row, removes all the roots corresponding to the width of the hoe blade, and expert thinners are able to control their strokes with such accuracy as to leave one, or at the most two, roots between the spaces.

This method of thinning beets is comparatively slow and with the scarcity of labor which prevails at present, many fields must be planted into other crops because sufficient labor is not available for manual thinning.

It is the object of this invention to produce a simple machine that can be moved along the rows at the normal speed of tractor travel, and which will shear all of the roots in certain spaces and leave one, or at the most two, roots between the spaces sheared.

Another object of this invention is to produce a machine for the purpose described which shall be of very simple construction, wherefore it can be manufactured and sold at a comparatively low price.

A further object of this invention is to produce a machine for the purpose specified, which shall not require power for rotating the operative elements, except that provided by the traction apparatus whether drawn by a team or a tractor.

Another object is to produce a machine for the purpose specified which shall be so constructed that the shearing disks bear such a relation to the ground that they tend to penetrate the suitable depth limiting means.

Another object of this invention is to produce a machine of such construction that by a simple change, the distance between the plants left standing can be altered to suit the ideas of the operator.

A further object is to produce a root thinner having means for effecting a separation of the parts so as to prevent breakage in case some hard element becomes positioned between the blades thereof.

The above and other objects that may become apparent as this description proceeds are attained by means of a construction and an arrangement of parts that will now be described in detail, and for this purpose reference will be had to the accompanying drawing in which the invention has been illustrated in its preferred form, and in which.

Figure 4:
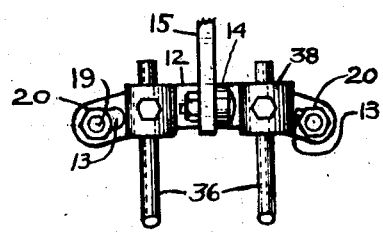
Figure 4 is a view of the frame looking in the direction of arrows 4—4, in Figure 2.
Figure 5:
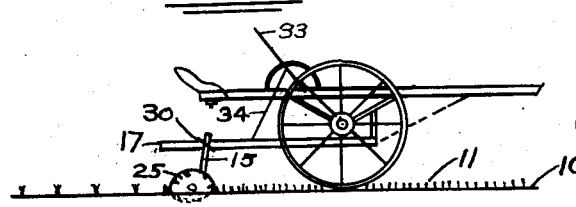
Figure 5 is a diagrammatic view showing the machine attached to the cultivator.

In the drawing reference numeral 10 designates the surface of the ground and 11 a beet plant of which large numbers are positioned in rows in the manner indicated in Figure 5. The machine consists of a frame member 12, which may be of castiron or steel and which has been shown as slightly arcuate. This frame member may, however, be straight, if desired. At each end of the frame member are elongated openings 13 and adjacent the middle point thereof is a lug 14. A bar 15 is attached to the lug 14 by means of a bolt 16. The surfaces between the lug and the bar may be serrated as indicated in Figure 4 to securely hold the frame and the bar in adjusted position. By means of this bar the machine can be secured to the tool holding beam 17 of a cultivator like that shown in Figure 5. Two bearings 18 are provided on one side with bolts 19 that pass through the openings 13. Nuts 20 serve to hold the bearings in position on the frame. Between the frame and the bearings, spacers 21 having serrated engaging surfaces may be positioned. The axes of the bearings are preferably coplanar and downwardly flaring and in the embodiment illustrated they are inclined with respect to each other at an angle of 45 degrees.

The particular angle, however, is not essential as any other suitable angle may be employed. Mounted in the bearings are shafts 22. The actual construction of the bearings have not been shown. It is contemplated, however, that each bearing shall be provided with suitable ball or roller assemblies to reduce friction, but since such anti-friction bearings are in common use and well known, they have not been illustrated herein. Secured to the upper ends of the shafts, which will be referred to hereinafter as the "tapering ends," are miter gears 23. These are held in position by means of nuts 24 and are, of course, splined to the shaft so as to rotate in unison therewith. In the present embodiment, the two gears are of the same size and therefore constrain the shafts to rotate at the same speed in opposite directions. This 1 to 1 ratio is not absolutely necessary, but is believed to be the most desirable. For reasons that will be obvious, the shafts may be rotated at a speed of 1 to 2, or any other desired ratio and the machine still effect the function desired. Secured to the lower or flaring ends of the shafts are disks 25 which are held in place by means of nuts 26. Suitable washers 27 may be interposed between the nuts and the disks. The disks employed are of the kind usually employed with rotary cultivators or with the common agricultural disks. In the present embodiment the disks are, of course, secured to the shaft so that they cannot rotate relative thereto. The disks differ from the ordinary disks principally in this, that each disk is provided with a number of peripheral notches 28. Where the two disks rotate at the same speed, these notches are spaced the same angular distance and the disks are so adjusted with respect to their shafts that the notches will have the same relative positions with respect to a plane containing the axes of rotation.

In the further description, it will be assumed that the shafts rotate at the same speed and that their angular relation is 45 degrees. It will also be further assumed that the bar 15 extends in the direction of the bisector of the angle between the axes of the shafts. The diameter of the disks is selected so that the distance between the adjacent notches is equal to the space that is to be thinned and the width of the notches is such as to permit only a single plant to enter or under exceptional conditions two plants. If the disks are so adjusted on their shafts that two opposing notches will be oppositely positioned when passing through the plane containing the axes of rotation, a space having an area of the combined area of the two notches will be formed in which no shearing of plants will occur. The size of the disks is so selected with respect to their angular relation and the corresponding proportions of the machine that the edges will be in very close contact when passing through the axial plane. It is also possible to slightly offset the disks so that they may overlap slightly at the bottom, thereby assuring a true shearing action. However, the preferable arrangement appears to be one in which the edges of the disks are in the same plane at their points of nearest approach. The angular relation of the shafts determines the inclination at which the disks enter the surface of the ground and as above pointed out, may be selected so as to get the most desirable operation. Since the disks are so adjusted that they will tend to travel a short distance below the surface of the ground, the friction between the ground and the disks will be sufficient to produce the necessary rotation and it is therefore merely necessary to draw this apparatus along a line of roots and to so position the disks with respect to the roots that the shearing edges of the disks will be as nearly as possible in line with the roots. Due to the shallow cut and to the greatly inclined relation between the ground and the disks, that part of the ground which is cut loose and which has been designated by reference numeral 29 will be deposited substantially in the same position as it was before the machine passed over. The roots that are positioned between the notches will be cut or sheared, whereas any root so positioned that it will come into the space of the notches will remain uncut. The cut roots will quickly wilt, whereas the uncut roots will, of course, continue to grow and produce the desired crop. It is preferable to have the notches of considerable radial depth so as to prevent injury in case the machine is slightly out of line with the line of roots. Theoretically, it might be possible to effect thinning with a single blade instead of with two, but such a machine would require extremely fine adjustment, for it is obvious that, if it moved slightly away, it would not shear any roots and would therefore be useless. By employing two disks, if the machine becomes displaced to either side, at least one of the disks will be effective to produce the desired thinning.

In Figure 5, the machine has been shown as secured to the tool beam by means of a clevis 30 in the manner in which many agricultural implements are held in position. This expedient is merely for the purpose of illustration, as it is the intention to employ any one of the standard and well known means for securing a ground working tool in position.

Where more than one row is thinned at a time, the machines are attached to the cultivator in such spaced relation as to conform to the distance between the rows. If a four-row seeder has been employed, it is possible to thin all four rows at the same time by using four separate machines properly spaced.

In the drawing grease cups 31 have been shown to indicate means for the purpose of lubrication. However, some of the standard pressure lubricating means is contemplated in which case the ordinary nipples used in connection with such lubricating means are employed instead of the conventional grease cups.

Figure 3:
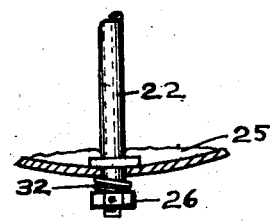
Figure 3 is a fragmentary section taken on a line corresponding to line 3—3, in Figure 2, and shows a yielding connection between one of the disks and its shaft for preventing breakage.
Figure 2:
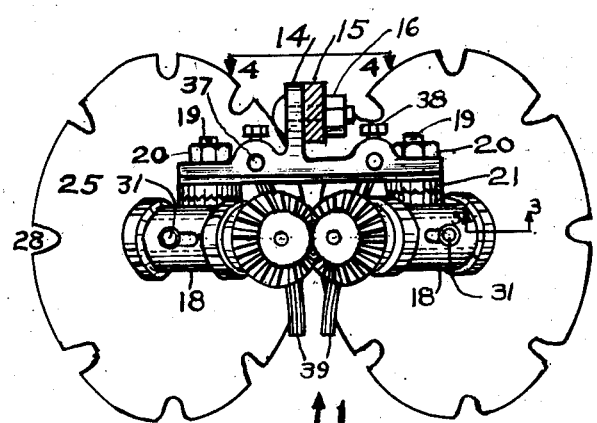
Figure 2 is a top plan view looking through plane 2—2, in Figure 1.

Beet fields are, as a rule, very carefully cultivated and seldom contain any rocks or other foreign matter. However, it may be that at times some hard elements, such as a stick of wood, or a stone, or other article may be so positioned as to come between the disks during the thinning operation. If the disks are so fixed to the machine as to prevent relative separation, the article thus caught may be dragged along and either break the disks or destroy a large number of plants. It is contemplated that the machine shall be provided with some spring means that will permit the disks to separate slightly when subjected to excessive pressure and in Figure 3, one simple form has been illustrated. In this form a spring 32 is positioned between the disk and the nut 26 and this permits the disk to yield sufficiently to prevent breakage. Other specifically different constructions may be substituted for the one illustrated in Figure 3, the latter has been shown more or less diagrammatically for the purpose of disclosing a means for this purpose.

Although it is believed that an equal rotation of the two shafts is preferable, a 2 to 1 ratio can be employed, in which case the shaft turning at the fastest speed will be provided with a disk having half as many notches. Such a construction would have several objectionable features, and although it might be employed in an emergency, it is not considered to be practical. Applicants, however, consider such a modification to be within the scope of their invention.

Particular attention is called to the fact that with this machine the roots or plants are severed below the hearts and below the surface of the ground and it is therefore necessary to have some means for limiting the depth at which the disks penetrate. Cultivators like that illustrated in Figure 5, are provided with levers 33 that are connected with the beams 17 by chains or other tension elements 34 which limit the depth to which disks may penetrate; handles which cooperate with quadrants 35 and constitute means for adjusting the depth. When the thinning device is attached to a cultivator, the latter will limit the depth to which the blades penetrate in the manner above described. The machine, however, has been so constructed that it can be attached to any implement and if this is not provided with means for limiting the depth, gauge bars 36 can be secured to the frame member 12 in the manner shown in the drawing. The frame may be provided with tubular lugs 37 through which the vertical portions of the gauge bars may pass and after the adjustment has been effected, the gauge bars are secured in position by means of set screws 38. At their lower ends the gauge bars terminate in rearwardly extending runners 39 that slide on the ground adjacent the beets and are so arranged as to be slightly forwardly flaring. The gauge bars have been shown as positioned between the disks as they will then tend to hold the strip of ground in position and prevent it from being broken up unduly by the rotating disks. The gauge bars may, however, be positioned on the outside of the disks by making suitable changes in the construction.

The "suck" or the force with which the disks tend to enter the ground is determined by the angular relation between a plane containing the axes of the shafts and the vertical. The axes containing plane is therefor upwardly and forwardly inclined as shown in Figure 5.

Since the depth can be regulated by either of the two means above described, and perhaps by many others that are specifically different, those shown and described are intended merely to disclose means in a broad way and applicants desire protection for this element, regardless of its specific embodiment.

Figure 1:
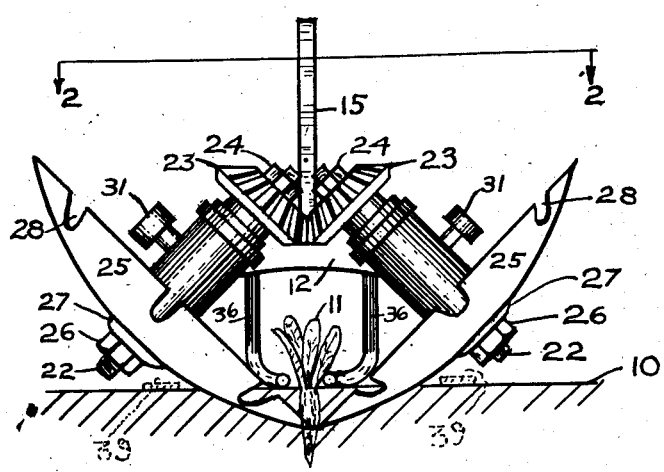
Figure 1 is a rear elevation of the machine looking in the direction of arrow 1 in Figure 2.

The spherical concavity of the disks may vary from flat to such curvature as may be found desirable. In some instances flat disks are preferable to spherical ones because such disks more readily penetrate the ground and have practically no tendency to disturb the earth. The runners 39 of the depth gauges can, in many cases, be positioned outside of the disks as indicated by the dotted lines 39 in Figure 1.

Having described the invention what is claimed as new is:

1. A machine for thinning sugar beets and the like by severing some of the roots below the heart, comprising two concavo-convex disks mounted for rotation about downwardly flaring axes, the concave side of the disks facing upwardly, the peripherial edges of the disks being in shearing relation, means comprising bevel gears for producing simultaneous rotation of the disks in opposite directions, the disks having complementary peripherial notches equiangularly spaced and arranged to register to form openings, and means for positioning the disks with respect to the ground so that their lowermost peripherial portions penetrate the ground sufficiently to effect rotation of the disks when moved forwardly, the plane containing the axes of rotation being upwardly and forwardly inclined to produce a force urging the disks downwardly to the depth determined by the ground positioning means.

2. A machine for thinning sugar beets and the like by severing some of the roots below the heart, comprising a horizontally extending frame, two bearings carried by the frame, one near each end, the axes of the bearings being downwardly and outwardly inclined, means for adjusting the angular relation of the bearings with respect to the frame, means for latching the bearings in adjusted position, a shaft journalled in each bearing, means for interconnecting the shafts for rotation in opposite directions, said means comprising bevel gears secured to the shafts above the bearings, and shearing disks carried by the lower ends of the shafts and rotatable therewith, the peripherial edges of the disks having spaced notches, the peripherial edges of the disks being positioned in shearing relation at their lowermost points.

3. A machine for thinning sugar beets and the like by severing some of the roots below the heart, comprising a horizontally extending frame, two bearings carried by the frame, one near each end, the axes of the bearings being downwardly flaring, means for independently adjusting the angular relation of the bearings with respect to the frame, said means comprising a pivotal connection between the bearings and the frame, means for latching the bearings in adjusted position, a shaft journalled in each bearing, means for interconnecting the shafts for equiangular rotation in opposite directions, said means comprising bevel gears secured to the shafts, and shearing disks carried by the lower ends of the shafts and rotatable therewith, the peripherial edges of the disks having notches in equiangularly spaced relation, the peripherial edges of the disks being positioned in shearing relation at their lowermost points.

4. A machine for thinning sugar beets and the like by severing some of the roots below the heart, comprising a frame, a bearing at each end of the frame, shafts mounted in the bearings, the shafts being downwardly flaring, means for interconnecting the shafts to secure simultaneous rotation in opposite directions, said means comprising bevel gears secured to the upper ends of the shafts, means for adjusting the angular relation of the shafts, and for latching them in adjusted position, a disk secured to the lower end of each shaft, the disks being positioned with their lower edges in shearing relation, the disks having equiangularly spaced notches positioned to register and form openings as the disks are rotated, at least one depth limiting means adjustably secured to the frame, said means terminating above the lowermost peripherial portions of the disks whereby the latter may penetrate the ground sufficiently to cause them to rotate as the machine is advanced, and means for supporting the machine so that the plane containing the axes of the shafts will be upwardly and forwardly inclined with respect to the direction of movement whereby the disks will penetrate the ground to the depth permitted by the depth limiting means.

5. A device in accordance with claim 4 in which a supporting bar is attached to the frame for adjustment about a pivot whose axis is substantially parallel with the frame, and means for clamping the bar in adjusted position.

6. A device in accordance with claim 2 in which a depth adjusting means is provided, said means comprising a member in engagement with the ground and operatively connected with the frame.

GOTTLIEB A. SCHIEL.
GOTTLIEB P. BEREN.